US012634265B2

(12) United States Patent
Sullivan et al.

(10) Patent No.: US 12,634,265 B2
(45) Date of Patent: May 19, 2026

(54) SECURE COMMUNICATION SYSTEM

(71) Applicant: BAE SYSTEMS plc, London (GB)

(72) Inventors: David James Sullivan, Christchurch Dorset (GB); Neville James Micklewright, Christchurch Dorset (GB)

(73) Assignee: BAE SYSTEMS PLC, London (GB)

( * ) Notice: Subject to any disclaimer, the term of this patent is extended or adjusted under 35 U.S.C. 154(b) by 153 days.

(21) Appl. No.: 18/291,046

(22) PCT Filed: Jul. 13, 2022

(86) PCT No.: PCT/GB2022/051815
§ 371 (c)(1),
(2) Date: Jan. 22, 2024

(87) PCT Pub. No.: WO2023/002160
PCT Pub. Date: Jan. 26, 2023

(65) Prior Publication Data
US 2024/0333692 A1 Oct. 3, 2024

(30) Foreign Application Priority Data

Jul. 21, 2021 (EP) ..................................... 21275097
Jul. 21, 2021 (GB) ..................................... 2110450

(51) Int. Cl.
*H04L 9/40* (2022.01)
*H04L 12/46* (2006.01)
*H04L 45/586* (2022.01)

(52) U.S. Cl.
CPC ...... *H04L 63/0428* (2013.01); *H04L 12/4633* (2013.01); *H04L 45/586* (2013.01)

(58) Field of Classification Search
CPC ............. H04L 63/0428; H04L 12/4633; H04L 45/586
See application file for complete search history.

(56) References Cited

U.S. PATENT DOCUMENTS

2009/0064305 A1* 3/2009 Stiekes ............... H04L 63/1441
726/11
2010/0265916 A1* 10/2010 Cheon ................... H04W 36/02
370/331

(Continued)

FOREIGN PATENT DOCUMENTS

| CN | 104506438 B | 6/2017 |
| EP | 3116171 B1 | 8/2018 |
| WO | 2016058329 A1 | 4/2016 |

OTHER PUBLICATIONS

International Search Report and Written Opinion dated Oct. 10, 2022 issued in PCT/GB2022/051815.

(Continued)

*Primary Examiner* — Mohamed A. Wasel
(74) *Attorney, Agent, or Firm* — Scully, Scott, Murphy & Presser, P.C.

(57) ABSTRACT

Method of creating secure tunnel(s), a router node (RN) implementing same and a network comprising RNs is provided. Method comprises connecting a RN to the network. RN comprises bearer interfaces, each having a VRF module; receiving, from neighbouring nodes (NNs), loopback address(es) for bearer interface(s) in the NNs, and detecting, using the RN, routing prefix(es) associated with a tunnel within the loopback address(es). In response using the RN to: build a routing table (RT) comprising loopback address(es) for a bearer interface of the same type in one of the NNs; extract, from the RT, an IP address per tunnel being created; and set each extracted IP address as the destination address for each tunnel. Method comprises establishing a tunnel to each NN, by selecting a bearer interface for each NN; learning the set destination addresses and building the tunnel to each NN using the learnt destination addresses.

15 Claims, 7 Drawing Sheets

(56)                    References Cited

U.S. PATENT DOCUMENTS

2011/0149979 A1\*  6/2011  Uttaro ..................... H04L 45/72
                                                                 370/401
2014/0201516 A1      7/2014  Bjarnason et al.
2018/0351882 A1    12/2018  Jeganathan et al.
2019/0335324 A1\*  10/2019  Ringland ........... H04L 61/5007

OTHER PUBLICATIONS

Extended European Search Report dated Dec. 22, 2021 issued in EP 21275097.0.
GB Search Report dated Apr. 26, 2022 issued in GB 2110450.0.
Eckert, T et al., "An Autonomic Control Plane (ACP); draft-ietf-anima-autonomic-control-plane-30.txt", An Autonomic Control Plane (ACP); draft-ietf-anima-autonomic-control-plane-30.txt; Internet-Draft: Anima WG, Internet Engineering Task Force, IETF; Standardworkingdraft, Internet Society (ISOC) 4, Rue, No. 30 (Oct. 30, 2020), pp. 1-180.

\* cited by examiner

Fig. 2

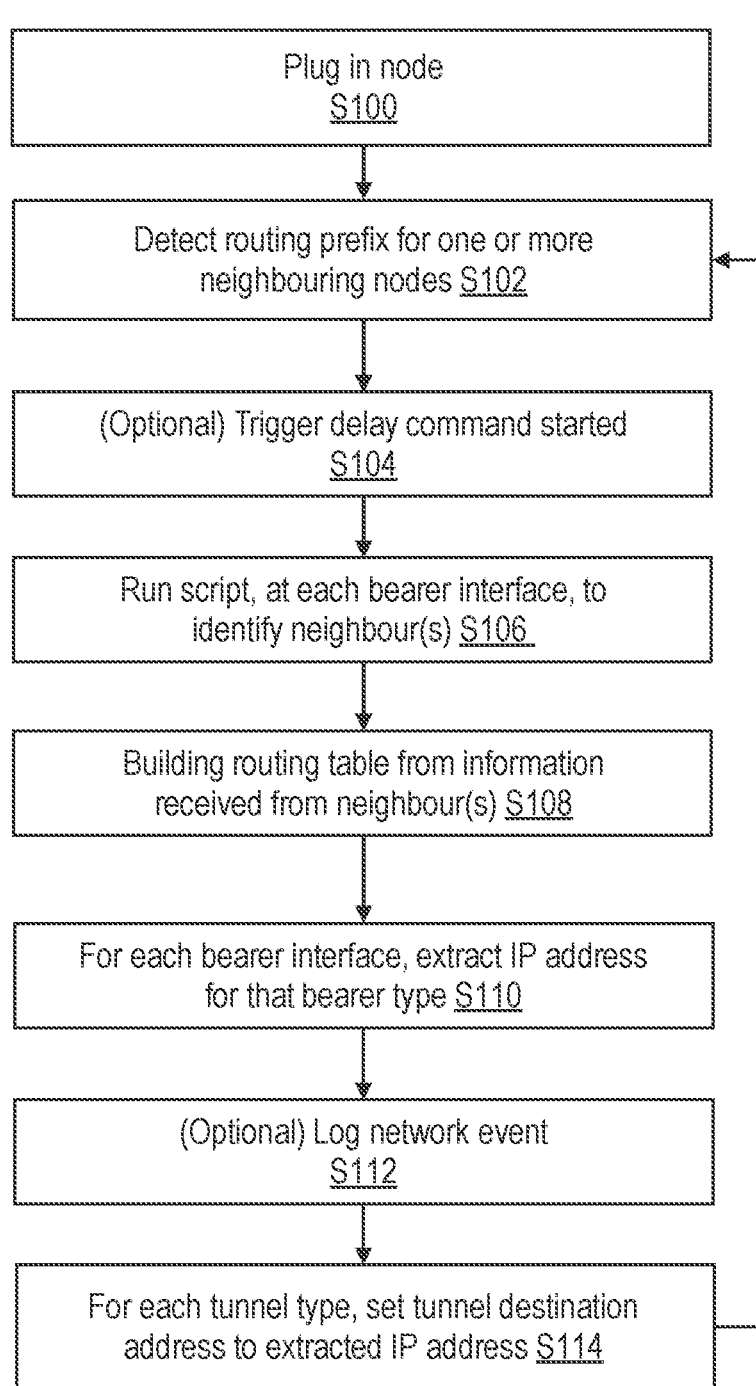

Plug in node
S100

Detect routing prefix for one or more
neighbouring nodes S102

(Optional) Trigger delay command started
S104

Run script, at each bearer interface, to
identify neighbour(s) S106

Building routing table from information
received from neighbour(s) S108

For each bearer interface, extract IP address
for that bearer type S110

(Optional) Log network event
S112

For each tunnel type, set tunnel destination
address to extracted IP address S114

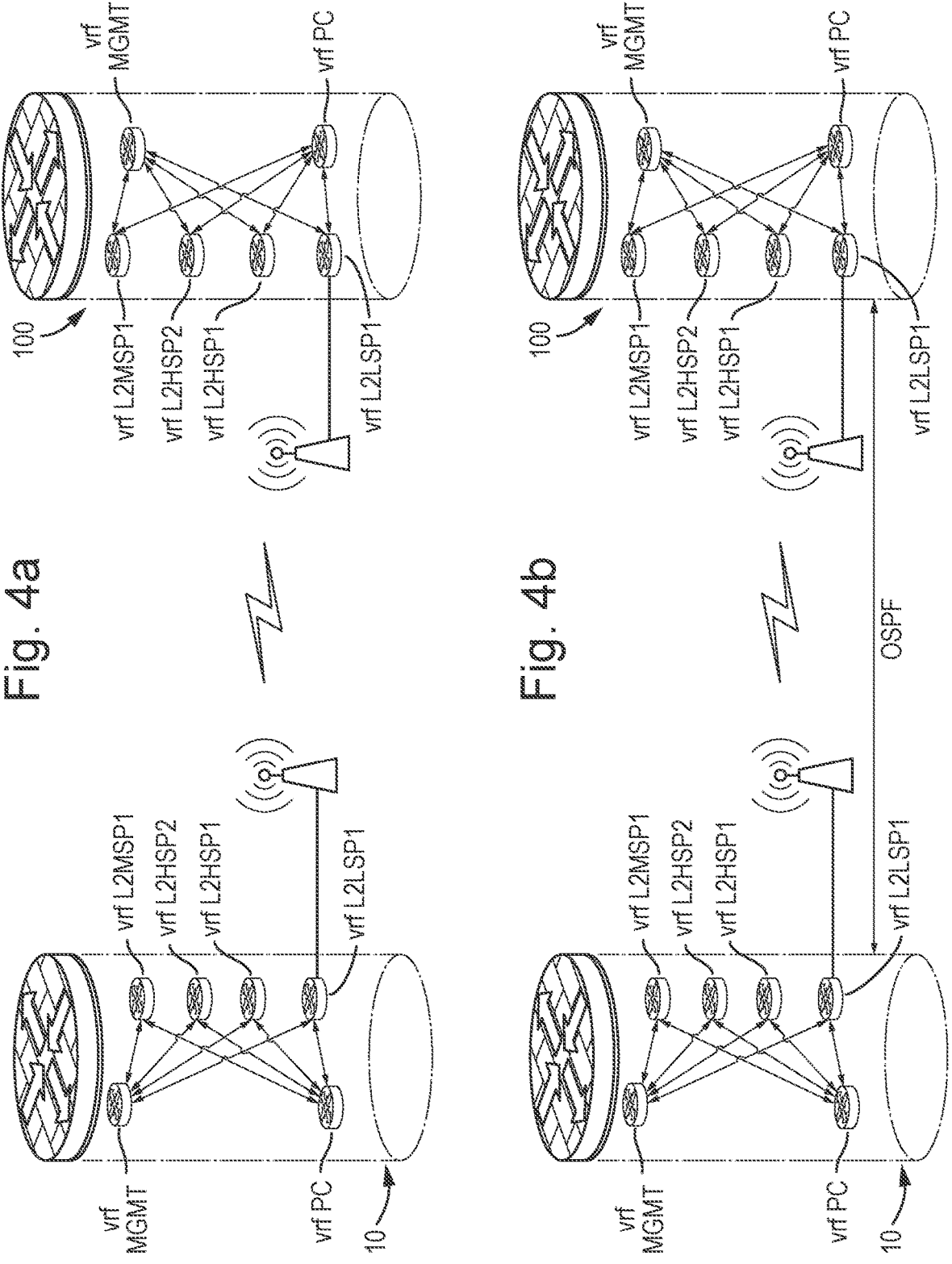

SECURE COMMUNICATION SYSTEM

FIELD OF THE INVENTION

The present invention relates to a secure communication system.

BACKGROUND

A deployed IP network typically comprises a plurality of routing nodes. When implementing a network solution, the design considerations include designing "plug and play" solutions, implementing intelligent routing, and providing a secure solution, e.g. one which is resistant from cyber threats.

For a "plug and play" solution, routing nodes must be easily connectable together with minimal user configuration. Pre-deployment planning is used ensuring that routing logic is not tied to physical connections. For instance, when nodes A, B, C, D are deployed, a plug and play solution means that they can be connected in any topology and the system will be able to form a logical network without changing node or link identity configuration. For intelligent routing, the path from source node to destination node is calculated based on a suitable metric, e.g. shortest path or lowest cost, which may be learnt and/or updated. When routing IP packets, the best path is chosen based on the metrics for the current network topology.

For a secure solution, critical networking functions are typically protected from Denial of Service (DOS) attacks from external systems and bearers. Such secure solutions may be required for sensitive applications, e.g. networks used for military or similar purposes. Examples of such protection include firewalls and Internet Protocol Security (IPSec) tunnel barriers. The protection may require manual configuration of the connections between nodes which prevents a "plug and play" solution. For example, existing deployed military networks rely heavily on a lengthy in-barracks data preparation phase prior to deployment. The protection may also obscure the routing path and metrics which may prevent the intelligent routing from being realized. Thus, the three design considerations are typically considered to be conflicting requirements.

The present applicant has recognized that sensitive networks may be frequently re-deployed, sometimes at short notice. However, once deployed, the networks described above can be inflexible if the network topology needs to change due to attrition, logistics, etc. Maintaining "plug and play" functionality can therefore be especially important in such situations. An alternative solution for creating secure communications systems is thus required.

SUMMARY

Embodiments of the present invention are intended to address the above technical problems.

According to an aspect of the present invention, there is provided a method of creating one or more secure traffic and management tunnels within a network, wherein the traffic tunnels are for transmission of data and the management tunnels are for management functions to communicate. The method comprises: connecting a first router node to the network, wherein the first router node comprises a plurality of bearer interfaces, each having a virtual routing and forwarding VRF module; receiving, from neighbouring nodes in the network, at least one loopback address for at least one bearer interface in the neighbouring nodes; and detecting, using the first router node, one or more routing prefixes associated with a traffic or management tunnel within the at least one received loopback address. In response to detecting the one or more routing prefixes, the method comprises using the first router node to: build a routing table comprising at least one loopback address for a bearer interface of the same type in one of the neighbouring nodes; extract, from the built routing table, an IP address for each of the traffic and management tunnels to be created; and set each extracted IP address as the destination address for each of the traffic and management tunnels. The method also comprises establishing a traffic and management tunnel to each neighbouring node, by selecting a bearer interface to connect to each neighbouring node; learning the set destination addresses for the traffic and management tunnels from the bearer VRF module for the selected bearer interface and building the management tunnel and the traffic tunnel to each neighbouring node using the learnt destination addresses.

In this way, the first router node is able to detect a neighbouring node and then self-configure the traffic and management tunnels so that data can be exchanged between the two nodes. Each pair of traffic and management tunnels between each pair nodes is built over a link between bearer interfaces in the first router node and the neighbouring node of the same type. However, each traffic and management tunnel built over the same link uses a unique address and is thus the tunnels are separate from one another. The automatic self-configuration means that the method may be considered to be "plug and play". The plug and play nature of this design significantly reduces the configuration burden on the user and offers additional flexibility once deployed.

The network may comprise a plurality of router nodes which may be connected by any appropriate topology. Adjacent or neighbouring router node are ones which are directly connected within the network. Other router nodes may be indirectly connected, e.g. using a mesh topology and it will be appreciated that in such arrangements there may be several hops from one router node to another router node. The types of interface may include high speed, medium speed and low speed.

The steps above are those at the first router node and it will be appreciated that these steps may be mirrored at each router node. According to another aspect of the invention, there may be provided a router node which is configured to implement the method above. For example, according to another aspect of the invention, there is provided a router node which is configured to implement the method of forming the traffic and management tunnels with one or more neighbouring nodes; and a memory for storing the or each routing table which is built. The router node may comprise a management virtual routing and forwarding VRF module and a traffic virtual routing and forwarding VRF module which establishes the management and traffic tunnels as described above. The router node also comprises a plurality of bearer interfaces, each having a virtual routing and forwarding VRF module.

The network of traffic tunnels which is formed between nodes in the network provides a secure network for the transmission of data. The network of management tunnels which is formed between nodes in the network provides a secure network for the management functions to communicate.

Prior to establishing the traffic and management tunnels, the method may further comprise forming a prep tunnel between the first router node and a neighbouring node. The prep tunnels may allow exchange of information, e.g. certificates, which is necessary for establishing the traffic and management tunnels. The method may further comprise extracting, from the built routing table, an IP address for the prep tunnel and setting the extracted IP address as the destination address for the prep tunnel in each bearer VRF module. The prep tunnel may be formed by learning the set destination for the selected bearer interface from the bearer VRF module and building the prep tunnel using the learnt destination address. Thus, the prep tunnel is also built over the same link as the traffic and management tunnels. The method may further comprise taking down the prep tunnel after the information has been exchanged.

The steps of extracting an IP address and setting the destination address may be considered to form a script, e.g. an embedded event manager (EEM) script which may be run within each router node. The EEM script may also build the corresponding addresses for the tunnel(s). By designing the IP schema, in particular the advertised loopback addresses, the logic within the script may be simplified.

Each loopback address may comprise a usage value that determines the loopback address usage, an interface identification number which indicates the number of the interface for each type of interface and an identification number for the node. Building a routing table may comprise determining whether the usage value of the received loopback address corresponds to an expected usage value for an interface of the same type. The expected usage value may be determined by the interface type and by the nature of the secure tunnel to be formed. For example, the usage value may be in a set range (e.g. 10 to 19) for a high speed interface and a traffic tunnel, in a different set range (e.g. 110 to 119) for a high speed interface and a management tunnel and in a different set range (e.g. 210 to 219) for a high speed interface and a prep management tunnel. The breadth of the range is likely to be determined by the number of interfaces that are permitted by the implementation. The value of the usage value may be equivalent to the one or more routing prefix.

The loopback addresses may be received via an open shortest path first (OSPF) protocol. The loopback address may a set of octets. The first octet may have a fixed value, e.g. 10. The second octet may be the usage value that determines the loopback address usage. The third octet may be an interface identification number which indicates the number of the interface for each type of interface. In some arrangements, there may be a fixed number of interfaces (e.g. 10) which can be accommodated. The fourth octet may comprise the identification number of the node. The identification number may be in a range (e.g. from 1 to 256).

The method may optionally comprise starting a trigger delay command in response to detecting the one or more routing prefixes and before carrying out the building, extracting and setting steps. The method may optionally comprise logging an event after the setting step has been completed.

Establishing the management and traffic tunnels may comprise using generic routing encapsulation (GRE). Establishing the management and traffic tunnels may comprise forming IP security (IPSec) over the one or more tunnels. This may enhance security within the network.

As described above, each bearer interface has an associated VRF module and may be considered to have its own virtual routing and forwarding (VRF) function. The plurality of bearer interfaces may comprise a plurality of layer 2 interfaces which are advertising the at least one loopback addresses. Layer 2 may also be termed the data link layer.

There is also a traffic VRF module which is preferably connected to the plurality of bearer VRF modules to learn the destination addresses for the traffic tunnel. The traffic VRF module may also be termed a protected core VRF module. Similarly, there may be a management VRF module in each node and the management tunnels may be established using the management VRF modules. Establishing the management tunnels may comprise learning the destination address from one of the bearer VRF modules.

According to another aspect there is provided a method of routing traffic across a secure network created using the method described above. According to another aspect there is provided a network comprising a plurality of interconnected router nodes as described above. The router nodes may be arranged in any suitable network topology.

The method of routing may comprise using intelligent routing when routing user traffic through the traffic tunnels, for example based on costs stored in the memory of each node. Intelligent routing may be used to determine an optimal (e.g. lowest cost) path through the network from source to destination.

According to a further aspect of the present invention there is provided a computer readable medium, or circuit, storing a computer program to operate methods substantially as described herein.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

FIG. 2 is a flowchart for phase 1 of a method of establishing a secure connection between the nodes of FIG. 1;

FIGS. 4a to 4e schematically illustrate a sequence of steps in connecting two neighbouring nodes by traffic and management tunnels;

FIG. 5 is a flowchart for a method of establishing the tunnels between the nodes.

DETAILED DESCRIPTION

Figure 1:
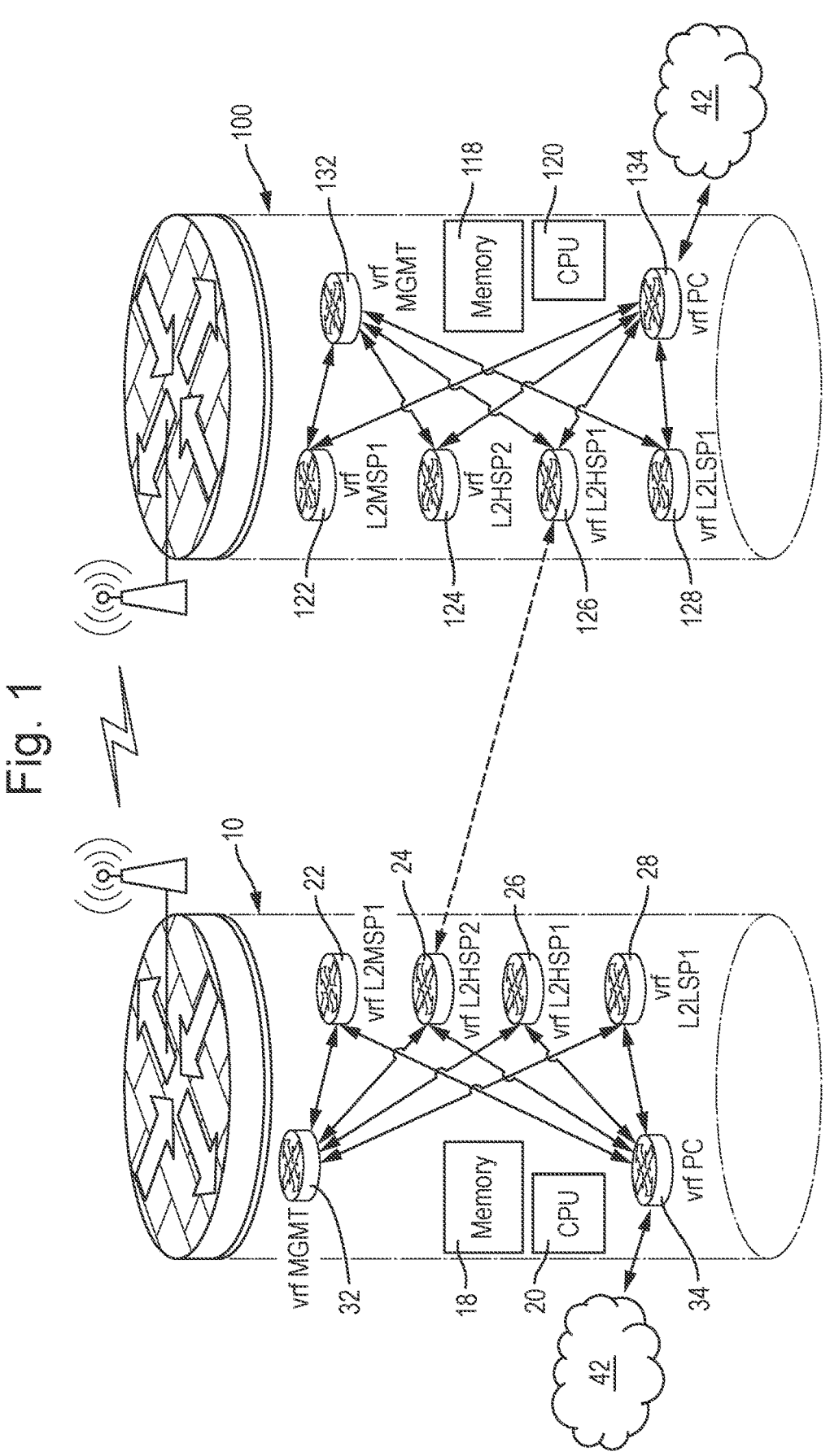
FIG. 1 illustrates two neighbouring nodes within a network.

FIG. 1 schematically shows an example embodiment comprising a local router node 10 and a neighbouring router node 100. Each of the nodes may be a core virtual machine

5

6

(VM) within a virtual private network (VPN). Each node may be any suitable router (e.g., a Cisco™ Cloud Services Router (CSR) 1000V). The terms core, router and node may be used interchangeably. Each node provides the secure routing functionality for the network of cores as described below.

Each of the nodes will include the standard components of whichever hardware solution deployed, including for example a processor 20, 120 and a memory 18, 118. The processor may be any standard component, including a central processing unit. It will be appreciated that there may be other standard components, which are omitted for clarity. The router may have the following functions: internet protocol (IP) base (for example Basic Networking Functions, RIP, OSPF (open shortest path first), BGP (border gate protocol), etc.); security (IPSec (internet protocol security) VPN); universal Windows platform apps (AppX, including VRF) and a throughput as per the system requirement (e.g., 1 Gbps).

Each of the router nodes also comprises a plurality of virtual interfaces, which may be limited to a threshold number of interfaces depending on the hypervisor that is being used to create the virtual interfaces. For example, there may be a limitation of 10 virtual interfaces when using a VMWare hypervisor. When more than 10 virtual interfaces are required, two router nodes may be used. In the context described below, a single virtual machine is sufficient. As explained in more detail below, each interface sits within its own virtual routing and forwarding (VRF) function that makes the identification process less complex. Every bearer VRF operates on the same subnet with the last octet being the node ID that enables any node to connect to any other.

The interfaces may be put into two groups: internal and external. The internal interfaces are all virtual and include all distributed switches and every virtual interface. Each internal interface operates at the required throughput, e.g. 1 Gbps. Several external interfaces may also be accommodated to allow the router node to be utilised in a variety of deployed networking scenarios. As described below, some of the interface types may be configured as "plug and play". Pure "plug and play" may be defined as the user deploying the arrangement with no equipment configuration. Each node 10 will auto-discover their neighbour 110 (and vice versa) and form a network with no user interaction. It may not be possible to make every interface "plug and play" because of interoperability requirements and protected segments.

FIG. 1 illustrates the interfaces that have been configured as "plug and play" in this example. The virtual interfaces operate at layer 2, which is also termed the data link layer. As is well known, layer 2 is the second layer of the seven-layer OSI model of computer networking. This layer is the protocol layer, which provides the functional and procedural means to transfer data between nodes. The virtual interfaces have been grouped into three speed types. The virtual interfaces include one or more layer 2 high speed interfaces, one or more layer 2 medium speed interfaces and one or more layer 2 low speed interfaces. There can be multiple interfaces of the same type on each node. These interfaces may be termed bearer interfaces. A bearer interface may also be termed a data interface and allows transmission of data between the interfaces.

As explained in more detail below, the method ensures that the node is connected to its neighbouring node via the same type of interface. In other words, a layer 2 medium speed interface (L2MSP1) on a first node 10 connects to a layer 2 medium speed interface (L2MSP1) on a neighbouring node 110. Similarly, a layer 2 high speed interface (L2HSP2) on the first node 10 connects to a layer 2 high speed interface (L2HSP1) on the neighbouring node 110. Each of the bearer interfaces has a virtual routing and forwarding (VRF) module, which may include a VRF table and a script as detailed below. As illustrated in this example, there are two layer 2 high speed VRF modules 24, 26, 124, 126, one layer 2 medium speed VRF module 22, 122 and one layer 2 low speed module VRF 28, 128 in each node.

In addition to these VRF modules which are associated with each bearer interfaces, each node has two additional VRF modules: a management VRF module 36, 136 and a protected core (PC) VRF module 34, 134. The management VRF module and the PC VRF module are both illustrated as being connected to each of the bearer interface VRF modules. It will be appreciated that this is a logical connection and allows the management virtual routing and forwarding (VRF) module to use routes learnt in the bearer VRF modules to establish secure management tunnels to their connected neighbours. This network of management tunnels between nodes provides a secure network that enables the management functions to communicate. Similarly, the PC virtual routing and forwarding (VRF) module uses routes learnt in the bearer VRF modules to establish secure PC tunnels to their connected neighbours. There are also PC interfaces, which provide an interface to cloud domains 42, e.g. coloured cloud information domains, so that they can transit the protected core network. This network of PC tunnels between nodes provides a secure network which is separate from the network of management tunnels and which is used to transmit data.

In addition to the networks of PC and management tunnels, an optional prep tunnel (which may also be termed a prep management tunnel) may also be formed between two nodes. The prep tunnel may be required when the necessary certificates to enable the PC and management tunnels to be established have not already been loaded. The prep tunnel may allow exchanges of certificates prior to forming the PC and management tunnels. Once the certificates have been exchanged, the prep tunnel may be taken down leaving just the PC and management tunnels.

In the commercial environment virtual routing and forwarding (VRF) is typically used to separate network traffic from different user communities using the same physical hardware. For example, if a business has a finance and sales team and does not want the sales team to have access to the secure finance server, they can be separated by either using separate physical hardware or use the same hardware and use VRF to separate the finance and sales network traffic. As shown in FIG. 1, each interface has its own VRF function that makes the identification process less complex as shown below.

FIG. 2 is a flowchart depicting the steps in connecting adjacent nodes such as the two nodes shown in FIG. 1. FIG. 2 may be considered to be a first phase of the plug and play process in which a connected neighbour is identified, and the corresponding destination addresses for the tunnels are set.

In a first step S100, a local router node is plugged into the network (which may be a WAN), i.e. the local router node is connected into the network via a bearer (e.g. radio, satellite, cable). The local router node is a router node of a bearer service (also termed a data service) that provides for transmission of user data. The nodes are then connected using the appropriate layer 2 protocol. Any appropriate protocol, for example open shortest path first (OSPF) or border gateway protocol (BGP) may be used to connect the local node to a neighbouring router node.

Figure 3:
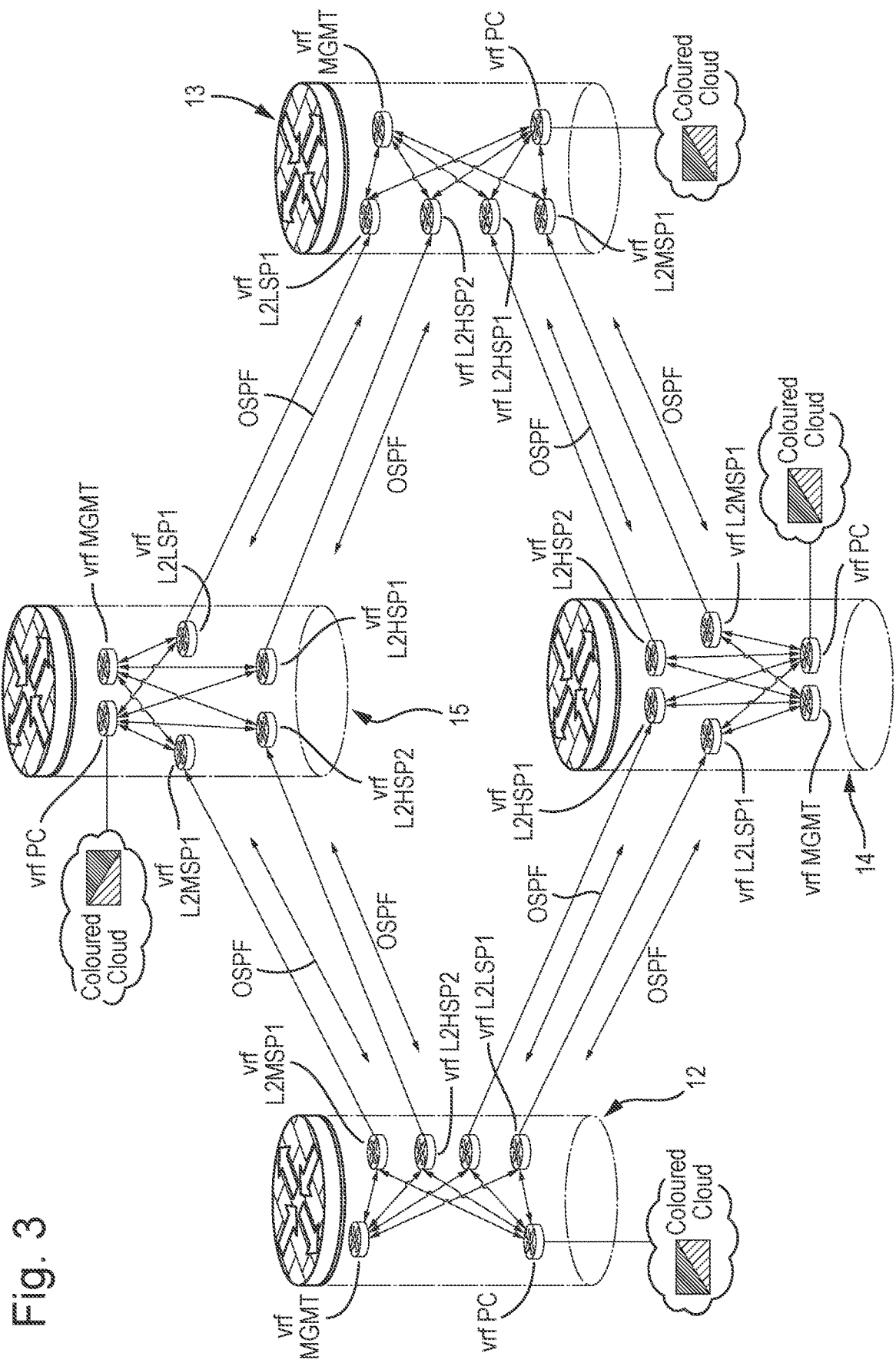
FIG. 3 illustrates multiple nodes and the communications therebetween to establish a network between the nodes.

FIG. 3 illustrates a plurality of nodes 12, 13, 14, 15 which are connected together in a network. It will be appreciated that four nodes are merely illustrative and there may be many more nodes. As shown in this example, the nodes are connected using OSPF over the physical link. Each node 12, 13, 14, 15 advertises the loopback addresses associated with each interface. The tables below show the advertised addresses for each node and each interface:

| Interface | Node 12 | 13 |
|---|---|---|
| L2MSP1 | LB20-10.20.1.12 | LB20-10.20.1.13 |
|  | LB120-10.120.1.12 | LB120-10.120.1.13 |
|  | LB220-10.220.1.12 | LB220-10.220.1.13 |
| L2HSP2 | LB20-10.10.2.12 | LB20-10.10.2.13 |
|  | LB120-10.110.2.12 | LB120-10.110.2.13 |
|  | LB220-10.110.2.12 | LB220-10.110.2.13 |
| L2HSP1 | LB20-10.10.1.12 | LB20-10.10.1.13 |
|  | LB120-10.110.1.12 | LB120-10.110.1.13 |
|  | LB220-10.210.1.12 | LB220-10.210.1.13 |
| L2LSP1 | LB30-10.30.1.12 | LB30-10.30.1.13 |
|  | LB130-10.130.1.12 | LB130-10.130.1.13 |
|  | LB230-10.230.1.12 | LB230-10.230.1.13 |

| Interface | Node 14 | 15 |
|---|---|---|
| L2MSP1 | LB20-10.20.1.14 | LB20-10.20.1.15 |
|  | LB120-10.120.1.14 | LB120-10.120.1.15 |
|  | LB220-10.220.1.14 | LB220-10.220.1.15 |
| L2HSP2 | LB20-10.10.2.14 | LB20-10.10.2.15 |
|  | LB120-10.110.2.14 | LB120-10.110.2.15 |
|  | LB220-10.110.2.14 | LB220-10.110.2.15 |
| L2HSP1 | LB20-10.10.1.14 | LB20-10.10.1.15 |
|  | LB120-10.110.1.14 | LB120-10.110.1.15 |
|  | LB220-10.210.1.14 | LB220-10.210.1.15 |
| L2LSP1 | LB30-10.30.1.14 | LB30-10.30.1.15 |
|  | LB130-10.130.1.14 | LB130-10.130.1.15 |
|  | LB230-10.230.1.14 | LB230-10.230.1.15 |

As illustrated in FIG. 3, each node receives these advertised addresses from its neighbouring nodes. The addresses may be received in a VRF table from each adjacent node, for example in VRF tables from each VRF module. Returning to FIG. 2, the next step S102 for each node is to detect when a particular routing prefix appears in the received information. The routing prefixes of interest may relate to one or all of the establishment of the PC tunnels, the management tunnels and the prep tunnels. The detection may be done in each bearer VRF module.

When a routing prefix is detected, for example when a routing prefix is detected in the received VRF table, a script is triggered. The script may be termed an embedded event manager (EEM) script. The script runs natively within the router, e.g. using the processor within the router. An example of the script is shown below and the event tag R1, R2 and R3 lines that are shown are the triggers for the EEM script. The example shown is for a layer 2 high speed bearer and it will be appreciated that scripts may be triggered in each VRF module if a routing prefix is detected. In this arrangement, any one of those routes appearing in the received VRF table will trigger the script to run.

```
! event manager applet L2HSP1
    description EEM Script to Detect Routes Added and Set Tunnel
```

-continued

```
Destination
    event tag R1 routing network 10.10.0.0/16 type add protocol
OSPF vrf name L2HSP1
    event tag R2 routing network 10.110.0.0/16 type add
protocol OSPF vrf name L2HSP1
    event tag R3 routing network 10.210.0.0/16 type add
protocol OSPF vrf name L2HSP1
    trigger delay 20
        correlate event R1 or event R2 or event R3
    !
```

As shown in step S104, when a prefix is detected, a trigger delay command may be started. For example, there may be a delay of fixed time, e.g. 20 seconds, before the script runs in its entirety. The script may also be rate limited by default to run once every 60 seconds (or other set value). Introducing rate limiting may prevent a flapping route from continuously triggering the script. The rate limit value and the delay may be configurable to suit the design.

The next step S106 is for the script to run. For example, the section of the script below may be used to build and display the contents of the routing table for the particular bearer interface (in this example the IP route for L2HSP1 using OSPF). As shown in the script section above, there are three similar sections: one for each of the three different types of tunnels, namely traffic, management and prep tunnels:

```
    action 10 cli command "enable"
        action 11 cli command "show ip route vrf L2HSP1 ospf | i
(10\.(10|110|210)\.[1-2]*\.[1-9]*)"
        action 12 foreach line "$_cli_result"
        action 13    regexp "(10\.10\.[1-2]*\.([1-9]|[1-9][0-9]|[1-
9][0-9][0-9]))" "$line" ip_traffic
    action 21    end
        action 22    regexp "(10\.110\.[1-2]*\.([1-9]|[1-9][0-9]|[1-
9][0-9][0-9]))" "$line" ip_mgmt
        action 29    end
        action 30    regexp "(10\.210\.[1-2]*\.([1-9]|[1-9][0-9]|[1-
9][0-9][0-9]))" "$line" ip_mgmtprep
        action 38 end
        !
```

By designing the IP schema with thought of how the EEM scripts need to identify the neighbour, the regular expression logic used within the EEM script may be simplified. For example, returning to the addresses which are being advertised at each node, e.g. considering L2HSP1 from node 12, this is advertising the following loopback addresses:

LB20-10.10.1.12
LB120-10.110.1.12
LB220-10.210.1.12

The loopback address is a network wide unique address which is advertised and used to build a tunnel between the local router node and the remote router node. Each routing instance between two nodes will require its own pair of network wide, unique addresses; one for each of the local router node (source address) and the remote router node (destination address).

Looking at the advertised addresses in more detail, the prefix (LB20, LB120, LB220) has been used as described above to trigger the script. In this arrangement, all IPv4 addressing has the first octet set at 10. The second octet determines the loopback address usage and may be termed a usage value. For example, 10 indicates traffic, 110 indicates management and 210 indicates prep management for this type of interface. Each of the different bearer types will use different numbers to identify the usage. It is also noted that the usage values are the same number as the routing prefixes. The full table is set out below:

| Loopback ID | 2nd Octet | Bearer Type | Function |
|---|---|---|---|
| 10-19 | 10 | L2HS | Traffic |
| 20-29 | 20 | L2MS | Traffic |
| 30-39 | 30 | L2LS | Traffic |
| 110-119 | 110 | L2HS | Management |
| 120-129 | 120 | L2MS | Management |
| 130-139 | 130 | L2LS | Management |
| 210-219 | 210 | L2HS | Prep Management |
| 220-229 | 220 | L2MS | Prep Management |
| 230-239 | 230 | L2LS | Prep Management |

The third octet is used to represent the number of the bearer interface for each type of interface and may be termed an interface identification number. In the examples shown in FIGS. 1 and 3, there are only one each of the low speed and medium speed interfaces and two of the high speed interfaces. It will be appreciated that showing just four interfaces is merely representative and there could be a different number of each type of interface. As set out above, in this arrangement there may be a maximum of 10 of any type of bearer interface. This could be increased as necessary. An example table is shown below:

| Bearer Type | 3$^{rd}$ Octet | Comment |
|---|---|---|
| Any | 1 | First Bearer Occurrence |
| . . . | . . . | . . . |
| Any | 10 | Tenth Bearer Occurrence |

The fourth octet is used to indicate the node ID, for this node this is 12. The number may be between 1 and 256.

Once the routing table has been built (and/or displayed), the next step is to extract the IP address which will be the destination address for each tunnel (PC, management or prep) for each bearer type. The extraction may be done by comparing the results in the routing table using a regular expression for each type of loopback expected, user traffic, management and prep. The simple schema identified above makes the scripting easier and prevents misconfiguration due to incompatible bearer types being connected together. The script for each bearer type will only extract, and subsequently configure, the IP address for that bearer type in the destination. In other words, the LSP interfaces will only extract IP addresses for other LSP interfaces, the MSP interfaces will only extract IP addresses for other MSP interfaces, and the HSP interfaces will only extract IP addresses for other HSP interfaces. All IP addresses for other types of bearer interfaces will be ignored.

Once a valid address for the bearer type has been identified, there is an optional step to log this event (step S112). For example, a syslog message may be generated and logged in the router's memory. This message may also be sent to a central syslog server if configured. This will form part of the management network. The logging of network events is good practice.

The final step S114 is the final task of the EEM script. This involves modifying the tunnel destination address to the address extracted from the routing table(s) as described above. Once this is done the script will end. As shown, the process may loop back to step S102 to await the detection of other routing prefixes. Each bearer interface VRF module now has a plurality of routes for the PC and management tunnels (and if needed the prep tunnel). The PC and management VRF modules may then use a command, e.g. tunnel vrf, to build the PC and management tunnels from the node to each neighbouring node, respectively using the routes in the bearer interface VRF modules. Once the process is complete, the tunnels will attempt to establish as described below.

An example extract from the script for setting the tunnel destination address(es) from a local node to a remote node is shown below for a L2HS. If the script within the local node has detected a loopback address in the correct range (i.e. 10, 110 or 210 in the second octet for L2HS), the loopback address is inserted into the destination address field for an associated tunnel (e.g. traffic, management or prep tunnel) from the local node to the remote node, thereby configuring these tunnel(s). As previously, there are three similar sections for each of the types of tunnel: T10 traffic tunnel, T110 management tunnel and T210 prep tunnel.

```
!
  action 13          regexp "(10\.10\.[1-2]*\.([1-9]|[1-9][0-9]|[1-
9][0-9][0-9]))" "$line" ip_traffic
    action 14        if $_regexp_result eq "1"
    action 15        puts "$ip_traffic"
    action 16        cli command "conf t"
    action 17        cli command "int Tunnel 10"
    action 18        cli command "tunnel destination $ip_traffic"
    action 19        cli command "end"
    action 20        syslog priority notifications msg "vcore node
$ip_traffic connected to L2HSP1"
    action 21        end
    action 22        regexp "(10\.110\.[1-2]*\.([1-9]|[1-9][0-9]|[1-
9][0-9][0-9]))" "$line" ip_mgmt
    action 23        if $_regexp_result eq "1"
    action 24        puts "$ip_mgmt"
    action 25        cli command "conf t"
    action 26        cli command "int Tunnel 110"
    action 27        cli command "tunnel destination $ip_mgmt"
    action 28        cli command "end"
    action 29        end
    action 30        regexp "(10\.210\.[1-2]*\([1-9]|[1-9][0-9]|[1-
9][0-9][0-9]))" "$line" ip_mgmt
    action 31        if $_regexp_result eq "1"
    action 32        puts "$ip_mgmt"
    action 33        cli command "conf t"
    action 34        cli command "int Tunnel 210"
    action 35        cli command "tunnel destination $ip_mgmt "
    action 36        cli command "end"
    action 37        end
    action 38 end
```

Figures 4C, 4D:
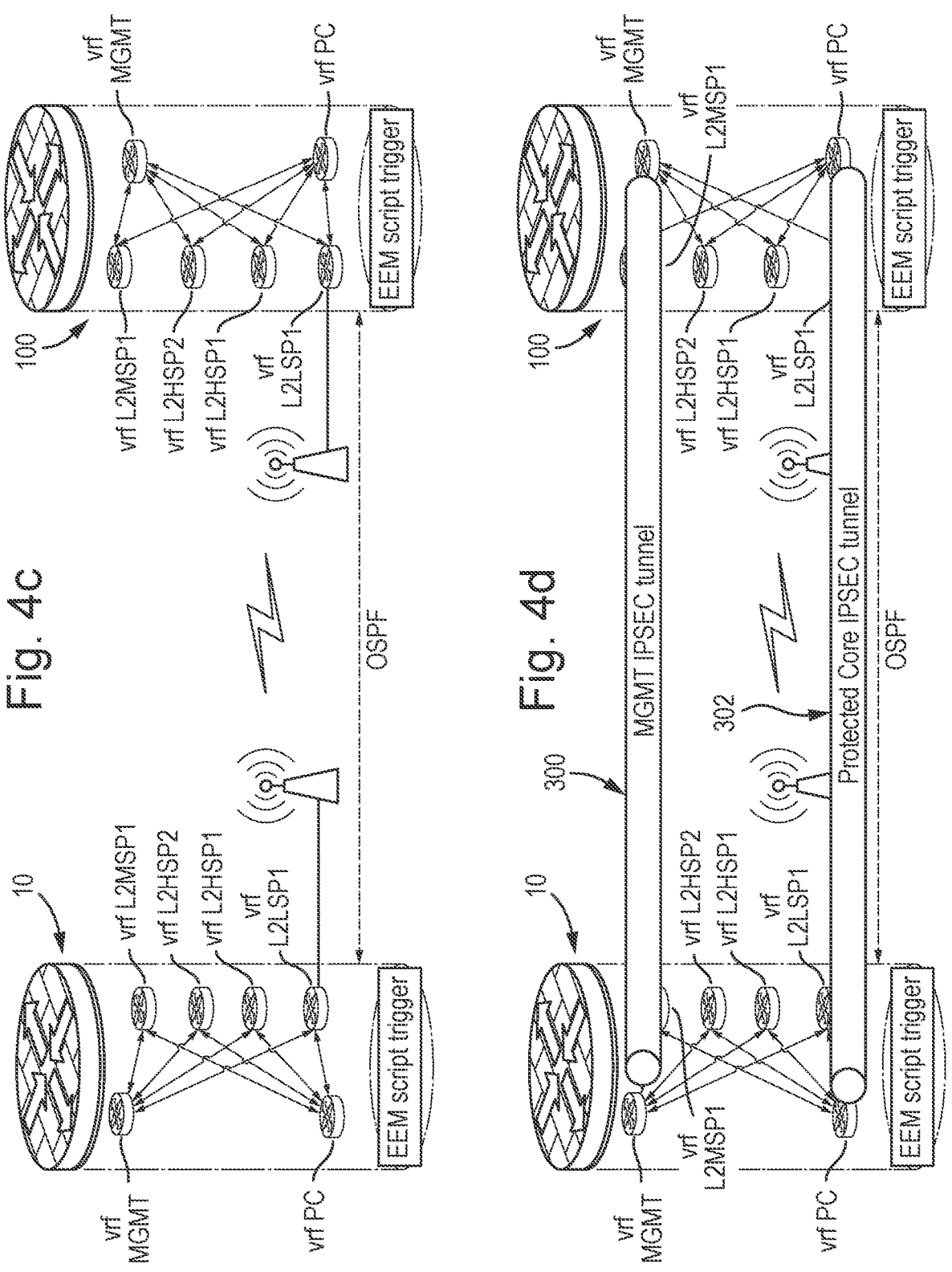

FIGS. 4a to 4c schematically illustrate the method described above. As illustrated in FIG. 4a, the local node 10 is connected to the remote node 100 using a radio frequency link between two low speed layer two interfaces. It will be appreciated that any suitable link may be used including for example a cable, L2 DLOS (direct line of sight) radio signal communication or L2 BLOS (beyond line of sight) radio signal communication. Once the link is established, as shown in FIG. 4b, the nodes 10, 100 are then connected using the appropriate layer 2 protocol, e.g., open shortest path first OSPF. Merely as an example, the OSPF connection between the two low speed layer two interfaces is illustrated.

Once connected, loopback addresses are advertised between nodes and each bearer interface VRF routing table is built as described above. As shown in FIG. 4c, the EEM script is triggered at a particular bearer interface when a particular prefix indicative of a PC, management or prep tunnel is detected in the bearer interface VRF routing table. As a result of the script being triggered, the tunnel destinations for the PC and management tunnels are configured based on the learnt loopback addresses as described above. Once the scripts have been run in the router, the destinations for the management tunnels are learnt using the information from the bearer interface VRF routing tables and may then be stored in the management VRF routing tables. Similarly, the tunnel destinations are learnt for the traffic tunnels using the information from the bearer interface VRF routing tables and may then be stored in the PC VRF routing tables. For example, the management VRF module and the PC VRF module may issue a "tunnel vrf command" to build the tunnels using routes learnt in another VRF.

Figures 4E, 5:
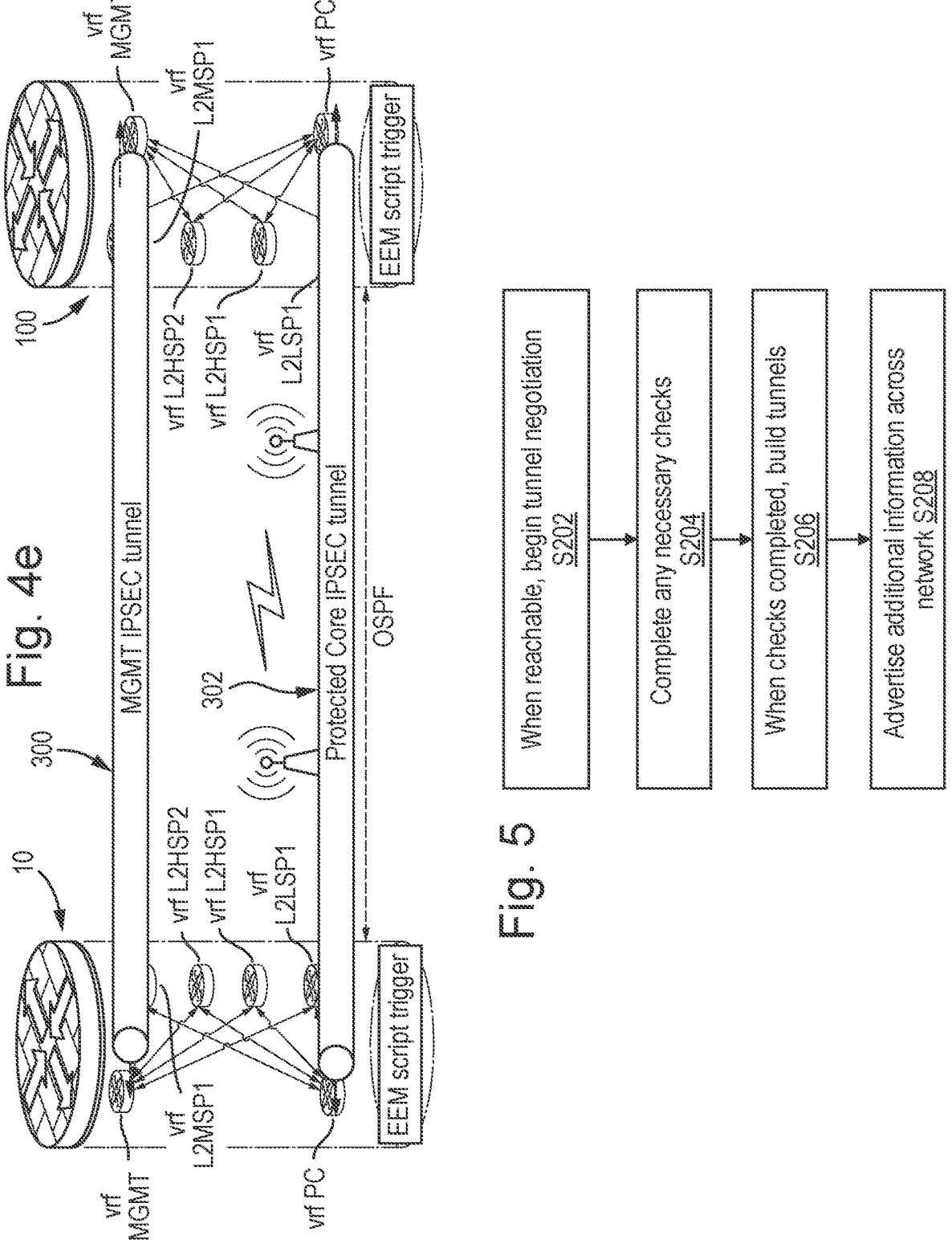

FIGS. 4d and 4e illustrate the creation of the network of tunnels and the steps are detailed in the flowchart of FIG. 5. This may be considered to a second phase of the "plug and play" method. When the destination address is still reachable, the tunnel negotiation may begin (step S202). In other words, a tunnel will automatically build if the destination address is reachable. The tunnel may use generic routing encapsulation (GRE) and may be part of a virtual private network (VPN). The tunnel may use the routing protocol OSPF (or another suitable protocol such as BGP). Internet Protocol Security (IPSec) may be formed over the tunnel, for example using pre-shared keys configured at both ends. In such an arrangement, the key will be configured before initial delivery and each node will hold a unique password. Thus, depending on the type of tunnel being formed, the necessary checks (e.g. IKEv2, RSA certificate and/or IPSec parameters) may be completed (step S204).

When the checks are completed, as shown at step S206, the tunnels may be built. FIG. 4d illustrates the management tunnel 300 and the protected core tunnel 302 between the two nodes 10, 100. As illustrated, both are IPSec tunnels. If the checks cannot be completed, the tunnels cannot be built. Once the tunnels are built, as shown at step S208, routing information may be advertised to learn the user networks and to build a network of tunnels. For example, as shown in FIG. 4e by the arrow at the end of each tunnel, each node is connected using an appropriate protocol over the tunnel, e.g. OSPF, which advertises the PC and management prefixes to establish the network of PC and management tunnels across the network of nodes.

Figure 6:
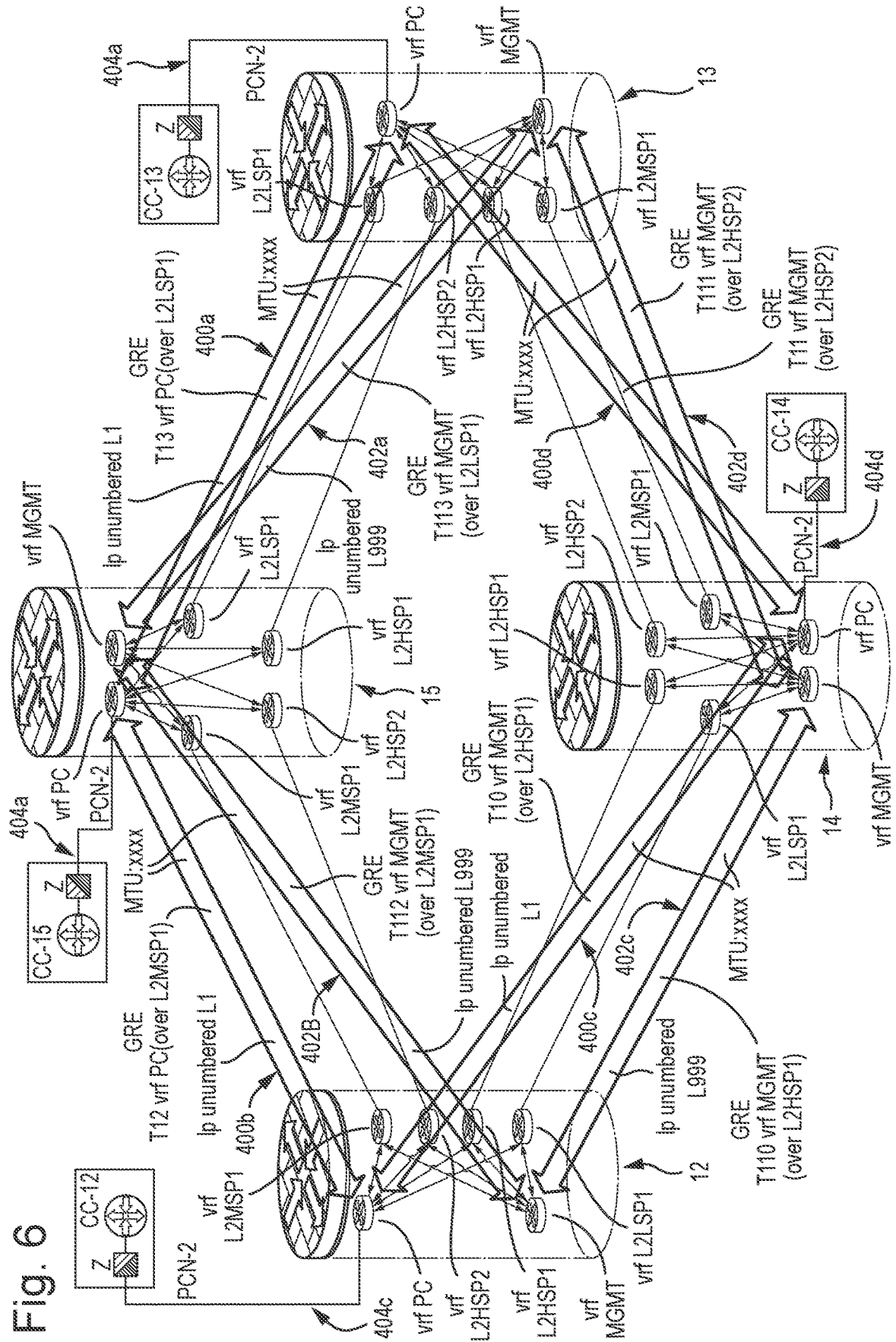
FIG. 6 illustrates the multiple nodes of FIG. 5 with pairs of nodes connected by tunnels.

Like FIG. 3, FIG. 6 illustrates four nodes with pairs of nodes connected by two tunnel networks: the PC tunnel network and the management tunnel network. The links between the layer 2 interfaces are also shown as simple lines. It is notable that the PC and management tunnels are both separate from each other so that the data can be kept separate for security. In this example, each of the tunnels uses GRE. Merely as an example, the network of PC tunnels comprises four PC tunnels 400a, 400b, 400c, 400d each connecting a pair of nodes and the network of management tunnels comprises four management tunnels 402a, 402b, 402c, 402d each connecting a pair of nodes. It will be appreciated that four is merely illustrative. There are also four connections 404a, 404b, 404c, 404d, one from each node, connecting to a user network or cloud domain.

As set out above, unique addresses are required for each source and destination. Merely as an example, in the arrangement of FIG. 6, the traffic tunnel 400a between nodes 13 and 15 may be formed over the link between the two low speed interfaces (L2LSP1) on each of the nodes. Similarly, the management tunnel 400b between nodes 13 and 15 is formed over the link between the two low speed interfaces (L2LSP1). Thus, using the loopback addresses given in the example of FIG. 3, the traffic tunnel 400a has unique source and destination addresses of LB30-10.30.1.13 and LB30-10.30.1.15, where LB30-10.30.1.13 is the loopback address advertised by node 13 and LB30-10.30.1.15 is the loopback address advertised by node 15. Similarly, the management tunnel has unique source and destination addresses of LB130-10.130.1.13 and LB130-10.130.1.15, respectively. These addresses are stored in the VRF tables associated with the L2LSP1 interface as described above.

Similarly, as an example the traffic tunnel 400d and the management tunnel 402d between nodes 13 and 14 is over the links between the high speed interfaces on these adjacent nodes (more specifically L2HSP1 on node 13 and L2HSP2 on node 14). Thus, the unique addresses for the traffic tunnel between this pair of nodes are LB20-10.10.1.13 and LB20-10.10.2.14 and the unique addresses for the management tunnel are LB120-10.110.1.13 and LB120-10.110.2.14, respectively. The traffic tunnel 400c and the management tunnel 402c between nodes 12 and 14 is over the links between the high speed interfaces on these adjacent nodes (more specifically L2HSP1 on node 12 and L2HSP1 on node 14). Thus, the unique addresses for the traffic tunnel between this pair of nodes are LB20-10.10.1.12 and LB20-10.10.1.14 and the unique addresses for the management tunnel are LB120-10.110.1.12 and LB120-10.110.1.14, respectively. The traffic tunnel 400b and the management tunnel 402b between nodes 12 and 15 is over the links between the medium speed interfaces on these adjacent nodes (more specifically L2MSP1 on node 12 and L2MSP1 on node 15). The unique addresses for the traffic tunnel between this pair of nodes are LB20-10.20.1.12 and LB20-10.20.1.15 and the unique addresses for the management tunnel are LB120-10.120.1.12 and LB120-10.120.1.15, respectively.

As shown in FIG. 6, each tunnel between a pair of nodes is built on a link between interfaces of the same type, e.g. both are high speed interfaces or both interfaces are medium speed interfaces. Both types of tunnels are built together but only one management tunnel and PC tunnel is built over each link. Where needed, a prep tunnel for each pair of management and PC tunnels can be built over the same link using the unique addresses with the appropriate prefixes, e.g. the unique addresses for the prep tunnel between the nodes 12 and 15 are LB20-10.220.1.12 and LB20-10.220.1.15. The method described above thus provides a convenient way to enable plug and play operation.

Terms such as 'component', 'module', 'processor' or 'unit' used herein may include, but are not limited to, a hardware device, such as circuitry in the form of discrete or integrated components, general processing units (GPUs), a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A method of creating secure traffic and management tunnels within a network, wherein the traffic tunnels are for transmission of data and the management tunnels are for management functions to communicate, the method comprising connecting a first router node to the network, wherein the first router node comprises a plurality of bearer interfaces, each having a virtual routing and forwarding VRF module;

receiving, from neighbouring nodes in the network, at least one loopback address for at least one bearer interface in the neighbouring nodes;

detecting, using the first router node, a routing prefix associated with a traffic or management tunnel within the at least one received loopback address;

in response to detecting a routing prefix, using the first router node to:

build a routing table comprising at least one loopback address for a bearer interface of the same type in one of the neighbouring nodes;

extract, from the built routing table, an IP address for each of the traffic and management tunnels to be created; and set each extracted IP address as a destination address for each of the traffic and management tunnels; and establishing a traffic and management tunnel to each neighbouring node, by selecting a bearer interface to connect to each neighbouring node;

learning the set destination addresses for the traffic and management tunnels from the VRF module for the selected bearer interface; and building the management tunnel and the traffic tunnel to each neighbouring node using the learnt destination addresses, whereby each pair of traffic and management tunnels to each neighbouring node is built over a link between bearer interfaces in the first router node and the neighbouring node of the same type.

2. The method of claim 1, further comprising forming a prep tunnel between the first router node and a neighbouring node prior to establishing the traffic and management tunnels.

3. The method of claim 2, further comprising:

extracting, from the built routing table, an IP address for the prep tunnel;

setting the extracted IP address as the destination address for the prep tunnel; and forming the prep tunnel by learning the set destination address for the selected bearer interface and building the prep tunnel using the learnt destination address.

4. The method of claim 1, wherein the loopback address comprises a usage value which determines the loopback address usage, an interface identification number which indicates the number of the interface for each type of interface and an ID of the node.

5. The method of claim 4, wherein building a routing table comprises determining whether the usage value of the received loopback address corresponds to an expected usage value for an interface of the same type.

6. The method of claim 4, wherein extracting an IP address for each of the secure tunnels comprises determining the usage value for the secure tunnel to be created and selecting the loopback address having a usage value which corresponds to the determined usage value.

7. The method of claim 1, comprising receiving the loopback addresses via an OSPF protocol.

8. The method of claim 7, wherein the loopback address comprises a second octet which is a usage value which determines the loopback address usage, a third octet which is an interface identification number which indicates the number of the interface for each type of interface and a fourth octet which is an identification number of the node.

9. The method of claim 1, further comprising starting a trigger delay command in response to detecting the routing prefix.

10. The method of claim 1, wherein establishing the traffic and management tunnels comprises using generic routing encapsulation.

11. The method of claim 1, wherein establishing the traffic and management tunnels comprises forming IP security over the one or more tunnels.

12. The method of claim 11, further comprising forming a prep tunnel between the first router node and a neighbouring node prior to establishing the traffic and management tunnels and sharing certificates using the prep tunnel before establishing the traffic and management tunnels.

13. A method of routing traffic across one or more secure tunnels in a network created using the method of claim 1.

14. A router node which is configured to implement the method of claim 1 to form traffic and management tunnels with one or more neighbouring nodes; and which comprises a memory for storing the or each routing table which is built by the method.

15. A non-transitory computer readable medium storing a computer program which when implemented on router node causes the router node to carry out the method of claim 1.

* * * * *